United States Patent
Kim (10) Patent No.: US 11,106,294 B2
(45) Date of Patent: Aug. 31, 2021

(54) SELF-CAPACITANCE TOUCH SCREEN AND DISPLAY DEVICE HAVING THE SAME

(71) Applicant: Samsung Display Co., Ltd., Yongin-si (KR)

(72) Inventor: Seon Ki Kim, Yongin-si (KR)

(73) Assignee: Samsung Display Co., Ltd.

( * ) Notice: Subject to any disclaimer, the term of this patent is extended or adjusted under 35 U.S.C. 154(b) by 138 days.

(21) Appl. No.: 15/210,412

(22) Filed: Jul. 14, 2016

(65) Prior Publication Data

US 2017/0185184 A1 Jun. 29, 2017

(30) Foreign Application Priority Data

Dec. 28, 2015 (KR) .................. 10-2015-0187486

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 7,053,968 B2 | 5/2006 | Hong et al. | |
| 8,289,285 B2 | 10/2012 | Jang et al. | |
| 8,530,766 B2 | 9/2013 | Choi | |
| 8,686,308 B2 | 4/2014 | Kuriki | |
| 8,780,078 B2 | 7/2014 | Kim et al. | |
| 8,847,901 B2 | 9/2014 | Oh | |
| 8,970,524 B2 | 3/2015 | Kim et al. | |
| 8,988,626 B2 | 3/2015 | Lee | |
| 9,201,533 B2 | 12/2015 | Kim et al. | |
| 9,268,440 B2 | 2/2016 | Ahn et al. | |
| 2014/0168538 A1 | 6/2014 | Kim et al. | |
| 2014/0362021 A1 | 12/2014 | Oh | |
| 2015/0022735 A1 | 1/2015 | Hsu | |
| 2015/0160767 A1 | 6/2015 | Song et al. | |
| 2015/0261348 A1 | 9/2015 | Jang et al. | |

FOREIGN PATENT DOCUMENTS

| | | |
|---|---|---|
| CN | 103631464 A | 3/2014 |
| CN | 103699256 A | 4/2014 |
| CN | 104133594 A | 11/2014 |
| CN | 204066077 U | 12/2014 |
| CN | 104571742 A | 4/2015 |
| KR | 10-1500330 B1 | 3/2015 |

OTHER PUBLICATIONS

Machine translation of KR1015003300 provided in IDS into English; Hong et al. (Year: 2015).*
Kim et al., Advanced In-cell Touch Technology for Large Sized Liquid Crystal Displays, SID 2015 Digest, pp. 895-898, 60.2, Paju-si, Gyeonggi-do, Republic of Korea.
Ohinese Office Action Report, Application No. 201611069254.4 dated Oct. 28, 2020, 9 pages.

* cited by examiner

*Primary Examiner* — Brian M Butcher
(74) *Attorney, Agent, or Firm* — Innovation Counsel LLP (57) ABSTRACT

A self-capacitance touch screen includes a plurality of sensing electrodes; and sensing lines connected to the sensing electrodes, wherein a number of sensing lines is smaller than a number of sensing electrodes.

24 Claims, 7 Drawing Sheets

SELF-CAPACITANCE TOUCH SCREEN AND DISPLAY DEVICE HAVING THE SAME

RELATED APPLICATIONS

The present application claims priority under 35 U.S.C. 119(a) to Korean Patent Application No. 10-2015-0187486, filed on Dec. 28, 2015, in the Korean Intellectual Property Office, the entire contents of which are incorporated herein by reference in their entirety.

BACKGROUND

1. Field

An aspect of the present disclosure relates to a self-capacitance touch screen and a display device having the same.

2. Description of the Related Art

A touch screen is an input device sensing a touch position of a user and inputting a command of the user. The touch screen is provided on the front of the display device, or integrated with the display device.

Recently, a self-capacitance touch screen has been developed for reducing a thickness of the touch screen. The self-capacitance touch screen senses a change of a capacitance between electrodes and detects the touch position when touched by a user's finger.

The self-capacitance touch screen includes a mutual capacitance touch screen and as a self-capacitance touch screen.

The self-capacitance touch screen includes a plurality of touch electrodes and sensing lines connecting each of the touch electrodes to a touch sensing unit, and the number of touch electrodes and the number of sensing lines are the same as each other. The self-capacitance touch screen senses the touch position of the user by sensing the changes of the capacitance formed in the touch electrodes.

In the meantime, as the self-capacitance touch screen is enlarged, the number of touch electrodes and the number of sensing lines increase. In the self-capacitance touch screen, as the number of sensing lines increases, light transmittance of the self-capacitance touch screen is reduced.

SUMMARY

According to an aspect of the present disclosure, there is provided a self-capacitance touch screen with a smaller number of sensing lines than that of sensing electrodes.

According to another aspect of the present disclosure, there is provided a display device including the self-capacitance touch screen.

According to an embodiment, a self-capacitance touch screen may comprise a plurality of sensing electrodes, and sensing lines connected to the sensing electrodes, wherein the number of sensing lines is smaller than the number of sensing electrodes.

The sensing electrodes may be disposed in a plurality of sensing rows or in a plurality of sensing columns, and the plurality of sensing rows or the plurality of sensing columns may include a plurality of sensing groups having at least one sensing electrode, and disposed in a row direction or a column direction The sensing groups may include a same number of sensing electrodes.

The number of sensing lines may be the same as the number of sensing electrodes in each of the sensing groups.

A capacitance of a sensing electrode in one sensing group may be different from a capacitance of a sensing electrode in another sensing group.

The sensing groups may include a plurality of sensing electrodes, and capacitances of the sensing electrodes in each of the sensing groups are same.

An area of a sensing electrode in one sensing group may be different from an area of a sensing electrode in another sensing group.

The sensing groups may include a plurality of sensing electrodes, and the areas of the sensing electrodes in each of the sensing group may be same.

Each of the sensing electrodes may include a square shape having an opening therein and area defined by outer edges of the square shape is same, and an area of an opening of the sensing electrode in the one sensing group is different from an area of an opening of a sensing electrode in another sensing group.

The areas of the sensing electrodes in one sensing group may be different from areas of sensing electrodes in another sensing group.

The sensing electrodes may be disposed in a plurality of sensing rows or in a plurality of sensing columns, and the sensing electrodes may include a plurality of regions electrically separated from one another.

A sum of areas of the regions in one sensing electrode may be the same as a sum of areas of the regions in the other sensing electrodes.

A sum of capacitances of the regions in one sensing electrode may be the same as a sum of capacitances of the regions in the other sensing electrodes.

A number of sensing lines may be the same as a number of regions in one sensing row or in one sensing column.

The sensing electrodes may include a first region and a second region electrically separated from the first region.

A capacitance of the first region in one sensing electrode may be different from a capacitance of a first region in another sensing electrode, and a capacitance of the second region in one sensing electrode may be different from a capacitance of a second region in another sensing electrode.

Each of the first regions of the sensing electrodes may include a square shape having an opening and an area defined by outer edges of the square shape is same, and an area of the opening in one sensing electrode is different from an area of an opening in another sensing electrode.

The second region may be disposed in the opening, and an area of the second region in one sensing electrode may be different from an area of a second region in another sensing electrode.

A display device may comprise a first substrate, a display element disposed on the first substrate, a second substrate facing to the first substrate, and a self-capacitance touch screen disposed on one side of the second substrate, wherein the self-capacitance touch screen includes: a plurality of sensing electrodes and sensing lines connected the plurality of sensing electrodes, and wherein a number of sensing lines is smaller than a number of sensing electrodes.

DETAILED DESCRIPTION

Embodiments of the inventive concept will be described with reference to the accompanying figures in detail.

Figure 1:
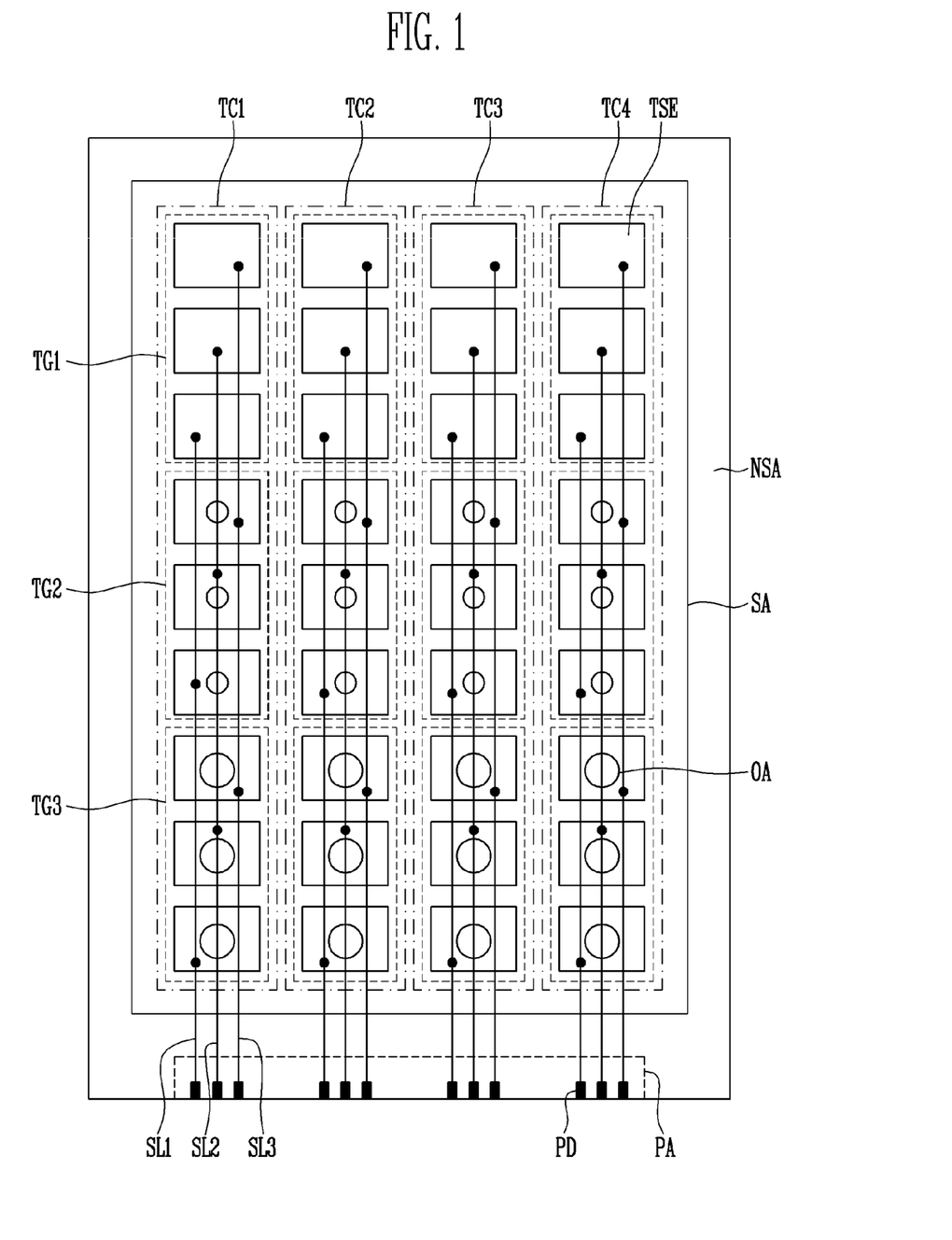
FIG. 1 is a plane view illustrating a self-capacitance touch screen according to an embodiment of the present disclosure.

FIG. 1 is a plane view illustrating a self-capacitance touch screen according to an embodiment of the present disclosure.

Referring to FIG. 1, the self-capacitance touch screen includes a sensing area SA and a non-sensing area NSA. The non-sensing area NSA may be disposed to be adjacent to the sensing area SA. For example, the non-sensing area NSA may surround the sensing area SA.

The self-capacitance touch screen may include a plurality of sensing electrodes TSE disposed in the sensing area SA, a plurality of sensing lines SL1, SL2, and SL3 electrically connected to the sensing electrodes TSE, and a pad unit PA including a plurality of pads PD electrically connected to each of the sensing lines SL1, SL2 and SL3 and disposed in the non-sensing area NSA.

The sensing electrodes TSE may be disposed in the sensing area SA. In addition, the sensing electrodes TSE may be arranged in a matrix shape. In other words, the sensing electrodes TSE may be disposed in a plurality of sensing rows TC1, TC2, TC3, and TC4 or a plurality of sensing lines SL1, SL2 and SL3. For example, the sensing electrodes TSE may be disposed in a first sensing row TC1, a second sensing row TC2, a third sensing row TC3, and a fourth sensing row TC4 disposed in a row direction.

The sensing electrodes TSE disposed in the sensing rows TC1, TC2, TC3, and TC4 may be classified as a plurality of sensing groups TG1, TG2 and TG3 including at least one sensing electrode TSE. For example, the sensing rows TC1, TC2, TC3, and TC4 may include a first sensing group TG1, a second sensing group TG2, and a third sensing group TG3, and each sensing group TG1, TG2, and TG3 may include three sensing electrodes TSE in the same sensing row.

An area of the sensing electrodes TSE of each of sensing group TG1, TG2, and TG3 may be the same as one another. An area of the sensing electrodes TSE of one of the sensing groups TG1, TG2, and TG3 may be different from an area of the sensing electrodes TSE of another of the sensing groups TG1, TG2, and TG3. Accordingly, the sensing electrodes TSE of the sensing groups TG1, TG2, and TG3 may have a self-capacitance different from one another. For example, the sensing electrodes TSE disposed in the first sensing group TG1 may have a first self-capacitance Cs1, and the sensing electrode TSE disposed in the second sensing group TG2 may have a second self-capacitance Cs2, and the sensing electrodes TSE disposed in the third sensing group TG3 may have a third self-capacitance Cs3.

In addition, the sensing electrodes TSE may be a square shape having the same area, and include an opening OA disposed inside of the square shape.

The sensing electrodes TSE of the same sensing group TG1, TG2, and TG3 may have the same area. Further, an area of the opening OA of the sensing electrodes TSE of one of the sensing groups TG1, TG2, and TG3 may be different from an area of the opening OA of the sensing electrodes TSE of the other sensing groups TG1, TG2, and TG3. However, the sensing electrodes TSE in one of the sensing groups TG1, TG2, and TG3 may not have the opening OA.

The sensing electrodes TSE may include conductive material that transmits light. For example, the sensing electrodes TSE may include indium tin oxide (ITO), indium zinc oxide (IZO), aluminum zinc oxide (AZO), gallium doped zinc oxide (GZO), zinc tin oxide (ZTO), gallium tin oxide (GTO) and at least one transparent conductive oxide of fluorine doped tin oxide (FTO).

In addition, the sensing electrodes TSE may include a metal mesh. In more detail, the sensing electrodes TSE may include a plurality of conductive lines which intersect one another. The conductive lines may include a plurality of first lines extended in one direction, and a plurality of second lines extended in a direction which intersects the first lines.

The sensing lines SL1, SL2 and SL3 may be connected to the pads PD. The sensing lines SL1, SL2, and SL3 may include metal material having excellent electroconductivity. For example, the sensing lines SL1, SL2, and SL3 may include at least one of silver (Ag), gold (Au), platinum (Pt), cooper (Cu), molybdenum (Mo), aluminum (Al), and alloy thereof.

The number of sensing lines SL1, SL2, and SL3 may be smaller than the number of sensing electrodes TSE in the same sensing row. For example, the number of sensing lines SL1, SL2, and SL3 disposed in one of the sensing rows TC1, TC2, TC3 and TC4, among the sensing rows TC1, TC2, TC3 and TC4, may be identical to the number of sensing electrodes TSE included in the sensing groups TG1, TG2 and TG3.

When the sensing groups TG1, TG2, and TG3 include three sensing electrodes TSE, a first sensing lines SL1, a second sensing line SL2, and a third sensing line SL3 may be included in the sensing rows TC1, TC2, TC3 and TC4.

The sensing lines SL1, SL2, and SL3 may contact one of the sensing electrodes TSE in the sensing groups TG1, TG2, and TG3. For example, the first sensing line SL1 may contact one of the sensing electrodes TSE in each of the first to third sensing groups TG1 to TG3. The second sensing lines SL2 may contact another sensing electrode TSE in each of the first to third sensing groups TG1 to TG3. The third sensing line SL3 may contact the other one of the sensing electrodes TSE in each of the first to third sensing groups TG1 to TG3. Each of the sensing lines SL1, SL2, and SL3 may contact every three sensing electrodes TSE in the same sensing row when the number of sensing electrode in the sensing groups is three. In other words, when there are M sensing lines in the sensing row, the sensing line may contact every M sensing electrodes TSE in the same sensing row.

The self-capacitance touch screen may sense the touch position of the user as below.

When the touch does not occur, a self-capacitance Ctotai measured by the first sensing lines SL1, the second sensing lines SL2, and the third sensing line SL3 may be equation 1 as below.

$$C_{total}=Cs_1+Cs_2-Cs_3 \quad \text{[Equation 1]}$$

Wherein, CS1 is a self-capacitance measured by the first sensing lines SL1, CS2 is a self-capacitance measured by the first sensing lines SL2, and 3 is a self-capacitance measured by the first sensing lines SL3.

When the touch occurs in the first sensing group TG1, a self-capacitance Ctotal' measured by the first sensing lines SL1, the second sensing lines SL2, and the third sensing line SL3 is equation 2 as below.

$$C_{tota}'=C_{S1}+\Delta C_{S1}+C_{S2}+C_{S3} \quad \text{[Equation 2]}$$

When the touch occurs in the second sensing group TG2, a self-capacitance Ctotal' measured by the first sensing lines SL1, the second sensing lines SL2, and the third sensing line SL3 is equation 3 as below.

$$C_{total}'=C_{S1}+C_{S2}+\Delta C_{S2}+C_{S3} \quad \text{[Equation 3]}$$

When the touch occurs in the third sensing group TG3, a self-capacitance Ctotal' measured by the first sensing lines SL1, the second sensing lines SL2, and the third sensing line SL3 is equation 4 as below.

$$C_{total}'=C_{S1}+C_{S2}+C_{S3}+\Delta C_{S3} \quad \text{[Equation 4]}$$

When the sensing rows TC1, TC2, TC3 and TC4 include N sensing groups and the user's touch occurs in $n^{th}$ sensing group, a self-capacitance Ctotal' measured by the first sensing lines SL1, the second sensing lines SL2, and the third sensing line SL3 is equation 5 as below.

$$C_{total}'=Cs_1+Cs_2+Cs_3+\ldots+\Delta Cs_8 \quad \text{[Equation 5]}$$

The sensing group TG1, TG2, and TG3 touched by measuring a variation of the self-capacitance transmitted through the sensing lines SL1, SL2, and SL3 may be identified. For example, when a variation of the self-capacitance transmitted through the sensing lines SL1, SL2, and SL3 is $\Delta Cs1$, it is considered that the user's touch occurs in the first sensing group TG1 because each sensing groups has different variation of the self-capacitance when touch event is occurred in the sensing group.

In addition, the sensing electrode TSE touched in each sensing group TG1, TG2, and TG3 may be identified by checking the sensing lines SL1, SL2, and SL3 in which the change of the self-capacitance occurs. For example, when the change of the self-capacitance is sensed in the first sensing line SL1, it is considered that the user's touch occurs in one of the sensing electrodes TSE connected to the first sensing line SL1, among the sensing electrodes TSE in the sensing groups TG1, TG2, and TG3. Accordingly, the sensing electrode TSE in which the user's touch occurs may be considered to be the sensing electrode TSE connected to the first sensing line SL1 in the first sensing group TG1.

The self-capacitance touch screen may include a smaller number of sensing lines SL1, SL2, and SL3 than the number of sensing electrodes TSE. Accordingly, even though the self-capacitance touch screen is enlarged, the self-capacitance touch screen may prevent reduction of light transmittance by the sensing lines SL1, SL2, and SL3.

Hereafter, another embodiment of the present disclosure shown in FIGS. 2 to 10 is now described. In FIGS. 2 to 10, a constituent element same as the constituent element illustrated in FIG. 1 has the same numeral reference, and the description thereof will be explained briefly. In addition, in order to avoid duplicate explanation, features different from FIG. 1 will be described.

Figure 2:
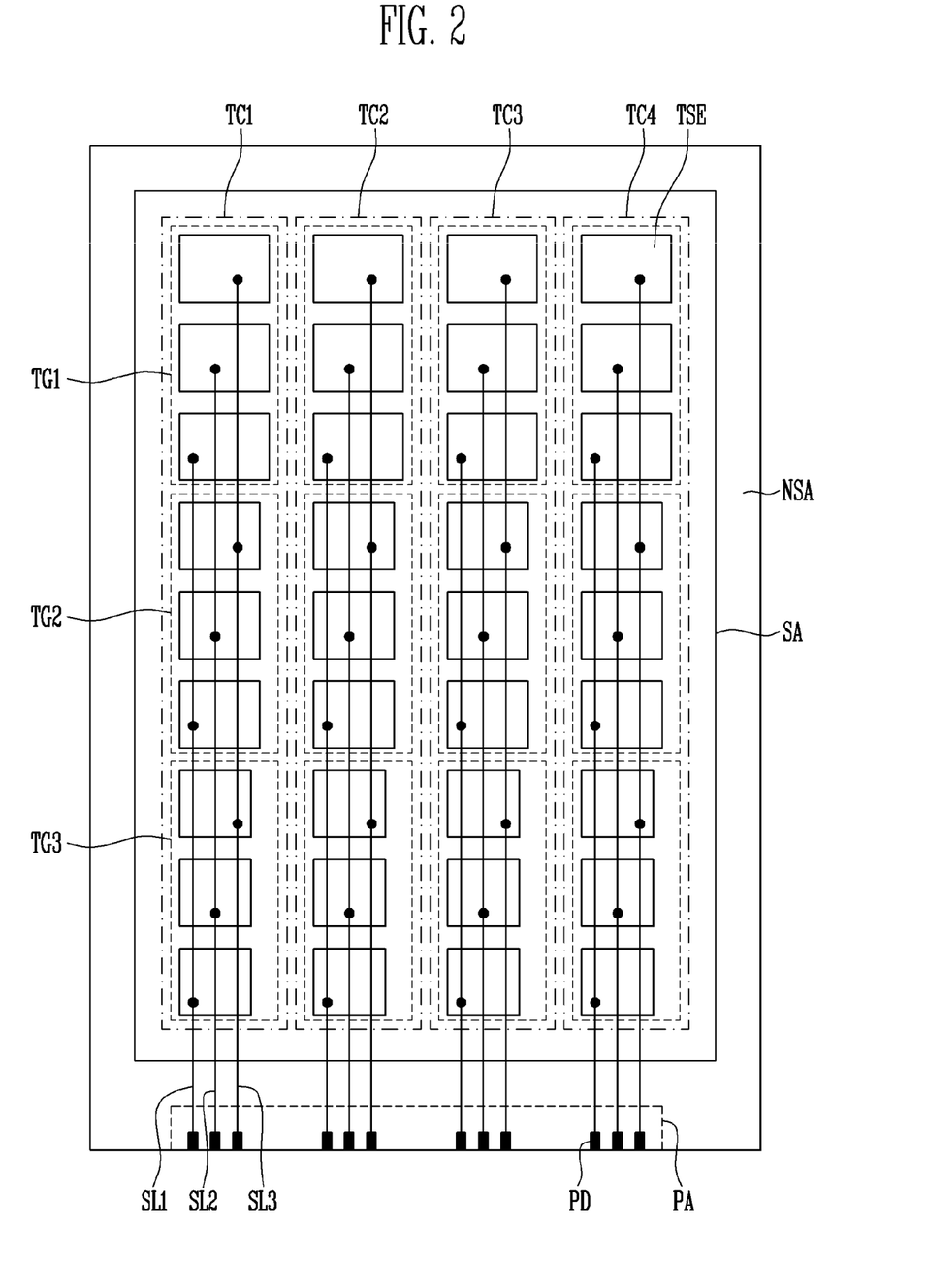
FIGS. 2, 3, 4 and 5 are plane views illustrating a self-capacitance touch screen according to the other embodiments of the present disclosure.

FIG. 2 is a plane view illustrating a display device including a self-capacitance touch screen according to another embodiment of the present disclosure.

Referring to FIG. 2, the self-capacitance touch screen may include a plurality of sensing electrodes TSE disposed in the sensing area SA, a plurality of sensing lines SL1, SL2, and SL3 electrically connected to the sensing electrodes TSE, and a pad unit PA including a plurality of pads PD electrically connected to each of the sensing lines SL1, SL2 and SL3 and disposed in the non-sensing area NSA.

The sensing electrodes TSE may be disposed in the matrix shape. In other words, the sensing electrodes TSE may be disposed in the plurality of sensing rows TC1, TC2, TC3, and TC4 or in the plurality of sensing lines.

In addition, the sensing electrodes TSE disposed in the sensing rows TC1, TC2, TC3, and TC4 may be classified as the plurality of sensing groups TG1, TG2 and TG3 including at least on sensing electrode TSE The sensing electrodes TSE of each sensing group TG1, TG2, and TG3 may include the square shape with the same area. Further, an area of the sensing electrodes TSE of one of the sensing groups TG1, TG2, and TG3 may be different from an area of the sensing electrodes TSE of the other sensing groups TG1, TG2, and TG3. For example, the sensing electrodes TSE close to the pads PD may have smaller area than the sensing electrodes TSE far away from the pads PD. Therefore, the sensing electrodes TSE of each sensing group TG1, TG2, and TG3 may have a different capacitance.

The sensing electrodes TSE may be connected to the pads PD through the sensing lines SL1, SL2, and SL3. In addition, the number of sensing lines SL1, SL2, and SL3 may be smaller than that of the sensing electrodes TSE.

Figure 3:
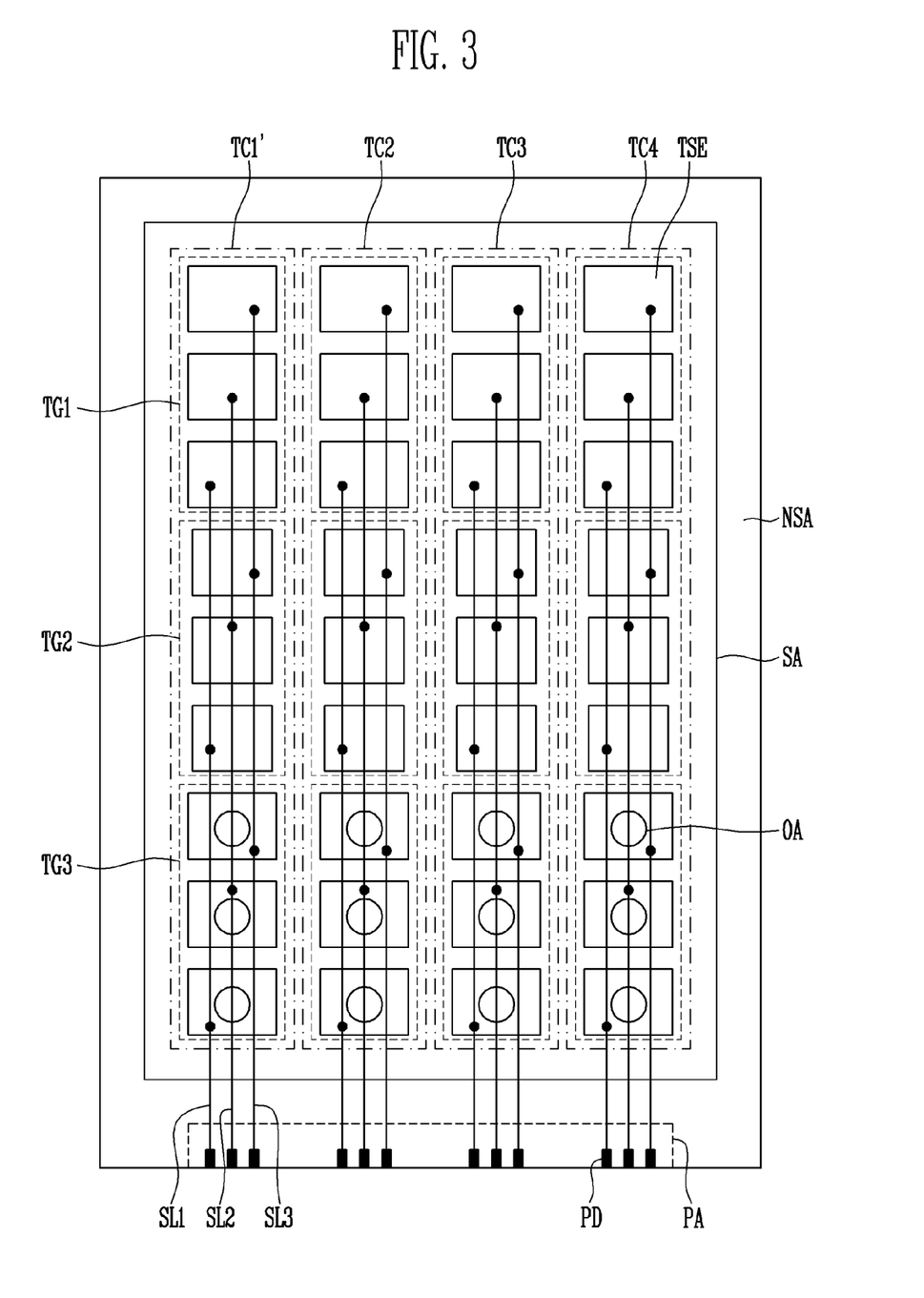

FIG. 3 is a plane view illustrating self-capacitance touch screen according to another embodiment of the present disclosure.

Referring to FIG. 3, the self-capacitance touch screen may include a plurality of sensing electrodes TSE disposed in the sensing area SA, a plurality of sensing lines SL1, SL2, and SL3 electrically connected to the sensing electrodes TSE, and a pad unit PA including a plurality of pads PD electrically connected to each of the sensing lines SL1, SL2 and SL3 and disposed in the non-sensing area NSA.

The sensing electrodes TSE may be disposed in the matrix shape. In other words, the sensing electrodes TSE may be disposed in the plurality of sensing rows TC1, TC2, TC3, and TC4 or the plurality of sensing lines.

In addition, the sensing electrodes TSE disposed in the sensing rows TC1, TC2, TC3, and TC4 may be classified as the plurality of sensing groups TG1, TG2 and TG3 including at least on sensing electrode TSE Areas of the sensing electrodes TSE of each of the sensing groups TG1, TG2 and TG3 may be the same as one another. Further, an area of the sensing electrodes TSE of one of the sensing groups TG1, TG2, and TG3 may be different from an area of a sensing electrode TSE of another of the sensing groups TG1, TG2, and TG3. Therefore, the sensing electrodes TSE of each of the sensing groups TG1, TG2, and TG3 may have a different capacitance from one another.

The sensing electrodes TSE may have the square shape. In addition, the sensing electrodes TSE of a part of the sensing groups TG1, TG2, and TG3 may include the openings OA, and the sensing electrodes TSE of the remaining of the sensing groups TG1, TG2, and TG3 may not include the openings OA.

The sensing electrodes TSE may contact the pads PD through the sensing lines SL1, SL2, and SL3. In addition, the number of sensing lines SL1, SL2, and SL3 may be smaller than that the number of sensing electrodes TSE.

Figure 4:
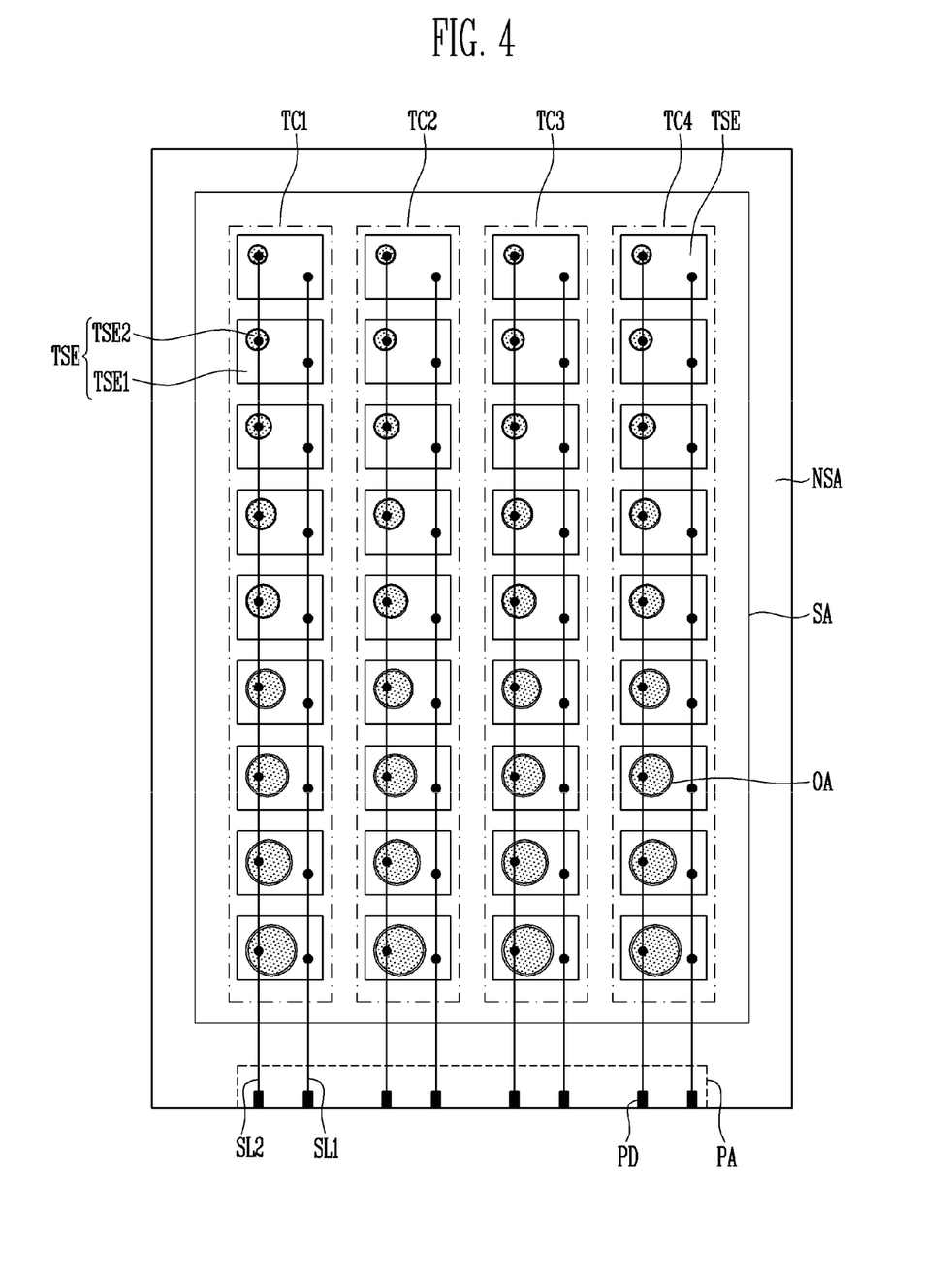
Figure 5:
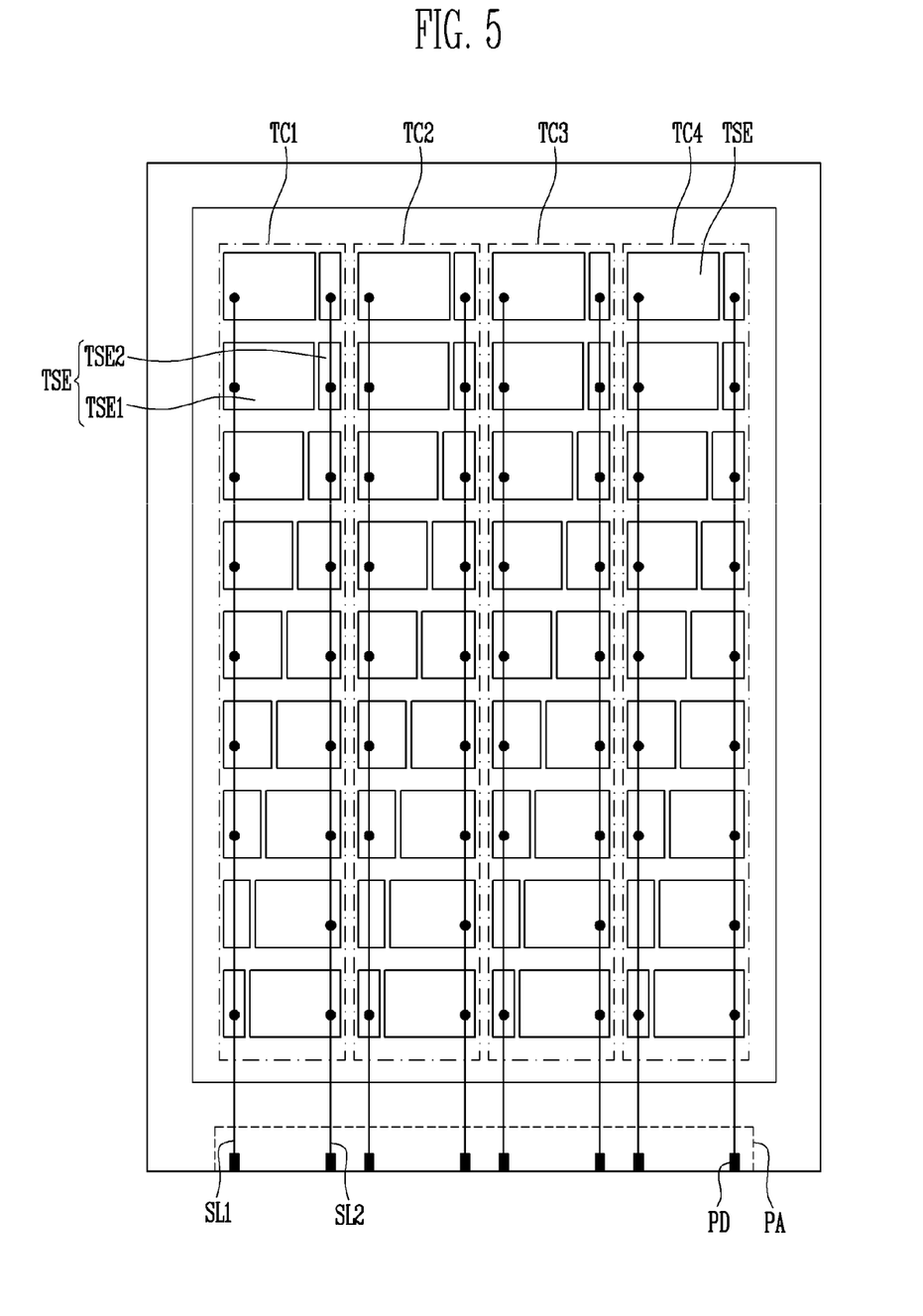

FIGS. 4 and 5 are plane views illustrating the self-capacitance touch screen according to the other embodiments of the present disclosure.

Referring to FIGS. 4 and 5, the self-capacitance touch screen may include a plurality of sensing electrodes TSE disposed in the sensing area SA, a plurality of sensing lines SL1 and SL2 electrically connected to the sensing electrodes TSE, and a pad unit PA including a plurality of pads PD electrically connected to each of the sensing lines SL1 and SL2, and disposed in the non-sensing area NSA.

The sensing electrodes TSE may be disposed in the matrix shape. In other words, the sensing electrodes TSE may be L (L is a natural number more than two) sensing rows TC1, TC2, TC3, and TC4 or L sensing lines.

The sensing electrodes TSE disposed in the sensing rows TC1, TC2, TC3, and TC4 may include a plurality of regions TSE1 and TSE2 electrically separated from each other. In the sensing electrode TSE, a sum of areas of the regions TSE1 and TSE2 of one sensing electrode TSE may be the same as a sum of areas of the regions TSE1 and TSE2 of the other sensing electrode TSE. In addition, a sum of capacitances of the regions TSE1 and TSE2 of one sensing electrode TSE may be the same as a sum of capacitances of the regions TSE1 and TSE2 of the other sensing electrode TSE. For example, the sensing electrode TSE may include a first region TSE1 and a second region TSE2 electrically separated from each other. In the sensing electrodes TSE, a sum of areas of the first region TSE1 and the second region TSE2 of one sensing electrode TSE may be the same as a sum of areas of the regions TSE1 and TSE2 of the other sensing electrode TSE. In addition, a sum of capacitances of the first region TSE1 and the second region TSE2 of one sensing electrode TSE may be the same as a sum of capacitances of the regions TSE1 and TSE2 of the other sensing electrode TSE.

The first region TSE1 and the second region TSE2 may have various configurations. For example, as shown in FIG. 4, the first region TSE1 of the sensing electrodes TSE may be the square shape and the area defined by outer edges of the square shape is same, and the openings OA may be included inside of the first region TSE1. An area of the openings OA of the first region TSE1 of one sensing electrode TSE may be different from an area of the first region TSE1 of another sensing electrode TSE. The second region TSE2 may be disposed in the opening OA. An area of the second region TSE2 of one sensing electrode TSE may be different from an area of the second region TSE2 of another sensing electrode TSE. For example, the openings OA close to the pads PD may have greater area than the sensing electrodes TSE far away from the pads PD. The sensing line SL1 is connected to the plurality of first regions TSE1 and the sensing line SL2 is connected to the plurality of first regions TSE2.

In addition, as shown in FIG. 5, the first region TSE1 and the second regions TSE2 may have the square shape which divides the sensing electrodes TSE to be from side to side. The area of the first region TSE1 of one sensing electrode TSE may be different from the area of the first region TSE1 of another sensing electrode TSE. In addition, the area of the second region TSE2 of one sensing electrode TSE may be different from the area of the second region TSE2 of another sensing electrode TSE. For example, the first region TSE1 close to the pads PD may have smaller area than the first region TSE1 far away from the pads PD and the second region TSE2 close to the pads PD may have greater area than the second region TSE2 far away from the pads PD.

The first region TSE1 of each sensing electrode TSE may contact the first sensing line SL1, and the second region TSE2 may contact the second line SL2. Accordingly, two sensing lines SL1 and SL2 may be necessary in one of the sensing rows TC1, TC2, TC3 and TC4.

The self-capacitance touch screen may sense the touch position of the user as follows.

In the sensing electrode TSE disposed in each sensing row TC1, TC2, TC3 and TC4, a capacitance of the first region TSE1 may be defined as Cs1P (P is a natural number more than 1), and a capacitance of the second region TSE2 may be defined as Cs2P (P is a natural number more than 1).

When the touch does not occur, the capacitance Ctotal measured through the first sensing line SL1 and the second sensing line SL2 may be equation 6 and equation 7 as follows.

$$C_{1total} = C_{S11} + C_{S12} + C_{S13} + \ldots + C_{S1P} \quad \text{[Equation 6]}$$

$$C_{2total} = C_{S21} + C_{S22} + C_{S23} + \ldots + C_{S2P} \quad \text{[Equation 7]}$$

In addition, when the touch does not occur in the first region TSE1 of $p^{th}$ sensing electrode TSE, the capacitances C1total' and C2total' measured through the first sensing line SL1 and the second sensing line SL2 may be equation 8 and equation 9 as follows.

$$C_{1total}' = C_{S11} + C_{S12} + C_{S13} + \ldots + C_{S1P} + \Delta C_{S1P} \quad \text{[Equation 8]}$$

$$C_{2total}' = C_{S21} + C_{S22} + C_{S23} + \ldots + C_{S2P} + \Delta C_{S2P} \quad \text{[Equation 9]}$$

In other words, the sensing electrode TSE touched by measuring the variation of the capacitance transmitted through the sensing lines SL1 and SL2 may be identified.

In addition, touch sensitivity may be improved since the change of the capacitance is sensed in the first region TSE1 and the second region TSE2 of the sensing electrodes TSE.

Figure 6:
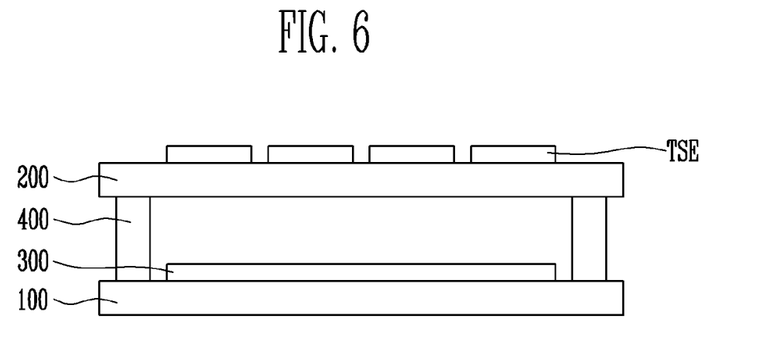
FIGS. 6, 7, 8, 9 and 10 are plane views illustrating a display device including a touch screen shown in FIGS. 1 to 5.
Figure 7:
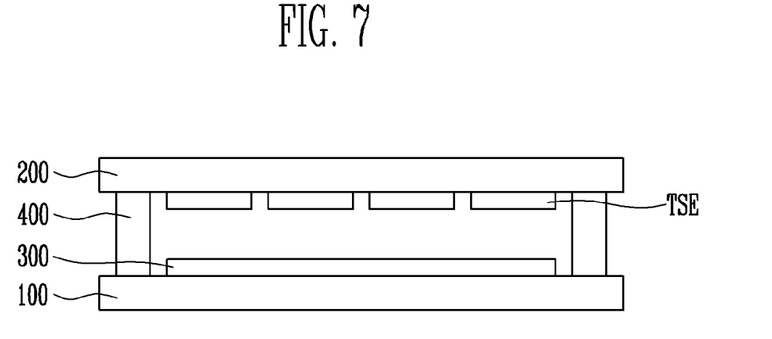

FIGS. 6 and 7 are plane views illustrating a display device including a touch screen shown in FIGS. 1 to 5.

Referring to FIGS. 6 and 7, the display device may include a touch screen comprising a first substrate 100, a display element 300 disposed on the first substrate 100, a second substrate 200 opposite to the first substrate 100, an encapsulant 400 attaching the first substrate 100 to the second substrate 200, and the plurality of sensing electrodes TSE disposed on one side of the second substrate 200.

The first substrate 100 may be a thin film transistor substrate comprising at least one thin film transistor (not shown.)

The display element 300 may be disposed on the first substrate 100 and electrically connected to the thin film transistor. The display elements 300 may be at least one of a liquid crystal display device (LCD device), an electrophoretic display device (EPD device), an electrowetting display device (EWD device), and an organic light emitting display device (OLED device.)

The second substrate 200 may be attached to the first substrate 100 and render the display element 300 to be isolated from an external environment.

The sensing electrodes TSE of the touch screen may include the shape shown in FIGS. 1 to 5. In addition, the sensing electrodes TSE may be disposed on one side of the second substrate 200.

The display device may include one of an on-cell type touch screen display device or an in-cell type touch screen display device. For example, as shown in FIG. 6, when the sensing electrodes TSE are disposed on an outer face of the second substrate 200, the display device may be the on-cell type touch screen display device. In addition, as shown in FIG. 7, when the sensing electrodes TSE are disposed on a side opposite to the first substrate 100 of the second substrate 200, the display device may be the in-cell type touch screen display device.

In the meantime, in the in-cell type touch screen display device, the touch screen may be integrated with the display element 300. The display device in which the touch screen is integrated with the display element 300.

Figure 8:
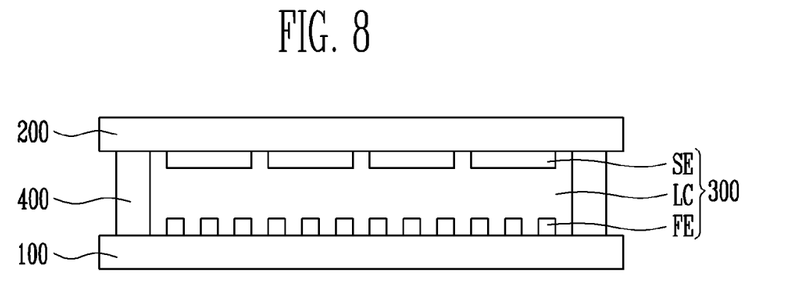
Figure 9:
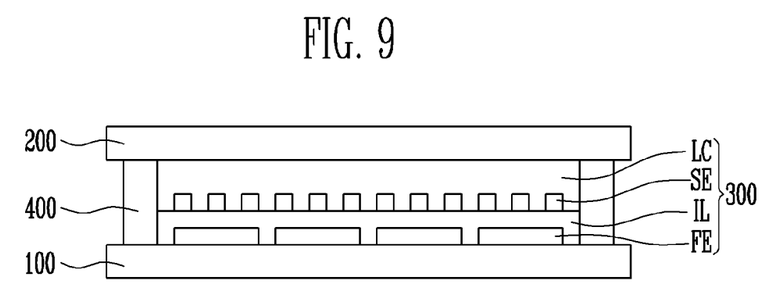

FIGS. 8 and 9 are plane views illustrating a display device according to other embodiments of the present disclosure.

Referring to FIGS. 8 and 9, the touch screen may be provided in the display device, and the touch screen may sense the touch position of the user.

In addition, the display device may include the first substrate 100, the second substrate 200 opposite to the first substrate 100, and the display elements 300 disposed between the first substrate 100 and the second substrate 200

Of one of the first substrate 100 and the second substrate 200, for example, the first substrate 100 may include a gate line, a data line intersecting the gate line, and at least one thin film transistor contacting the gate line and the data line.

The display element 300 may be a liquid crystal display element integrated with the touch screen.

For example, as shown in FIG. 8, the display element 300 may include first electrodes FE disposed in the plurality of pixel regions of the first substrate 100, respectively, second electrodes SE disposed on the second substrate 200 and opposite to the first electrodes FE, and a liquid crystal layer LC disposed between the first electrodes FE and the second electrodes SE.

The first electrode FE may contact the thin film transistor. In addition, the second electrode SE may include a plurality of electrode patterns. The electrode patterns may correspond to the plurality of first electrodes FE. When a power is applied to the first electrode FE and the second electrode SE, the first electrode FE and the second electrode SE may form a vertical alignment, liquid crystal molecules included in the liquid crystal layer LC may be controlled.

In addition, as shown in FIG. 9, the display elements 300 may include the first electrode FE disposed on the first substrate 100, an insulating layer IL covering the first electrode FE, and the second electrodes SE disposed on the insulating layer IL, and the crystal layer LC disposed between the second electrodes SE and the second substrate 200.

The first electrode FE may include the plurality of electrode patterns. The second electrodes SE may contact the thin film transistor. Each of the second electrodes SE may include a plurality of slits (not shown.) Accordingly, when a power is applied to the first electrode FE and the second electrode SE, the first electrode FE and the second electrode SE may form in plane alignment, and the liquid crystal molecules included in the crystal layer LC may be controlled.

The electrode patterns may be connected to sensing lines (not shown) and sense the user's touch. The sensing lines may be disposed in alignment with one of the gate line and the data line. A common power signal or a touch sensing signal may be applied in the electrode patterns through the sensing lines. That is, when the common power signal is applied to the electrode patterns, the electrode patterns may perform as a common electrode of the crystal display device. In addition, when the touch sensing signal is applied to the electrode patterns, the electrode patterns may perform as the sensing electrode of the touch screen.

In the meantime, the electrode patterns may have the same shape as the sensing electrodes in FIGS. 4 and 5. That is, the electrode patterns may include the first region TSE1 and the second region TSE2 electrically separated from each other. The touch sensing signal and the common power signal may be alternately applied to at least one of the first region TSE1 and the second region TSE2.

For example, the touch sensing signal and the common power signal may be alternately applied to the first region TSE1, and the common power signal may be applied to the second region TSE2. Accordingly, the first region TSE1 may perform as a common electrode of the liquid crystal display element and the touch sensing electrode, and the second region TSE2 may perform as the common electrode of the liquid crystal display element.

In addition, the touch sensing signal and the common power signal may be alternately applied to the first region TSE1 and the second region TSE2. Accordingly, the first region TSE1 and the second region TSE2 may perform the common electrode of the crystal display device and the touch sensing electrode.

In addition, since the change of the capacitance may be sensed in the first region TSE1 and the second region TSE2 of the sensing electrodes TSE, touch sensitivity of the touch screen may be improved.

Figure 10:
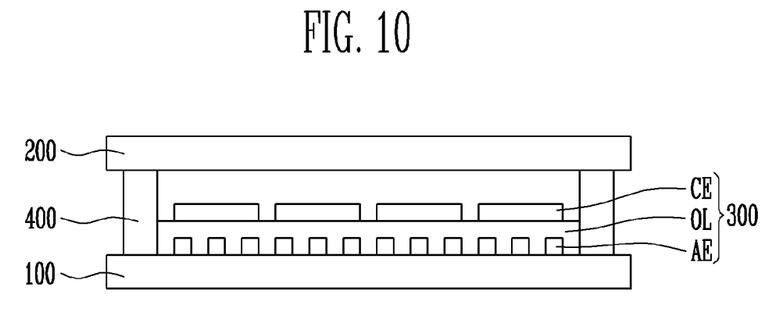

FIG. 10 is a plane view illustrating a display device according to another embodiment of the present disclosure.

Referring to FIG. 10, the display device may include the first substrate 100, the second substrate 200 opposite to the first substrate 100, and the display element 300 disposed between the first substrate 100 and the second substrate 200.

Of one of the first substrate 100 and the second substrate 200, for example, the first substrate 100 may include the gate line, the data line intersecting the gate line, and at least one thin film transistor contacting the gate line and the data line.

The display element 300 may be an organic light emitting display element integrated with the touch screen. For example, the display element 300 may include first electrodes AE disposed in the plurality of pixel regions on the first substrate 100, an organic layer OL disposed on the first electrodes AE, and second electrode CE disposed on the organic layer OL.

At least one of the first electrode AE and the second electrode CE may be an anode electrode, and another one is a cathode electrode. For example, the first electrode AE may be the anode electrode, and the second electrode CE may be the cathode electrode.

In addition, at least one of the first electrode AE and the second electrode CE may be a transmissive type electrode. For example, when the display element is a bottom emission type organic light emitting element, the first electrode AE may be the transmissive type electrode, and the second electrode CE may be a reflective type electrode. When the display element is a top emission type organic light emitting element, the first electrode AE may be the reflective type electrode, and the second electrode CE may be the transmissive type electrode. When the display device is a double-sided emission type organic light emitting element, the first electrode AE and the second electrode CE may the transmissive type electrodes. In an embodiment, the top emission type organic light emitting element will be described as an example of the display element.

In each pixel region, the first electrode AE may be disposed on the first substrate 100. The first electrode AE may include a reflective film (not shown) reflecting light and a transparent conductive film (not shown) disposed in the above below the reflective film. At least one of the transparent conductive film and the reflective film may contact the drain electrode DE.

The reflective film may include material which reflects the light. For example, the reflective film may include at least one of aluminum (AL), silver (Ag), molybdenum (Mo), platinum (Pt), Nickel (Ni) and alloy thereof.

The transparent conductive film may include transparent conductive oxide. For example, the transparent conductive layer may include one of include indium tin oxide (ITO), indium zinc oxide (IZO), aluminum zinc oxide (AZO), gallium doped zinc oxide (GZO), zinc tin oxide (ZTO), gallium tin oxide (GTO) and at least one transparent conductive oxide of fluorine doped tin oxide (FTO).

The organic layer OL may include a multi-layer thin film structure including at least one light emitting layer. For example, the organic layer OL may include a hole injection layer (HIL) in which a hole is injected, a hole transport layer (HTL) with excellent transporting of holes and increasing recombination opportunity of hole and electron by suppressing movement of the electron, a light emitting layer (EML) emitting the light by the recombination of the injected electron and the injected hole, a hole blocking layer (HBL) suppressing the movement of the hole which is not combined on the light emitting layer (EML), an electron transport layer (ETL) to easily transport the electron to the light emitting layer (EML), an electron injection layer (EIL) in which the electron is injected.

The hole injection layer (HIL), the hole transport layer (HTL), the hole blocking layer (HBL), the electron transport layer (ETL), the electron injection layer (EIL) may be the common layer connected to the pixel regions adjacent to each other.

Color of light generated on the light emitting layer ELM may be one of red, green, blue, and white, but it is not limited thereto. For example, the color of the light generated on the light emitting layer ELM on the organic layer OL may be one of magenta, cyan, and yellow.

The second electrode CE may be disposed on the organic layer OL. The second electrode CE may be a transflective film. That is, the second electrode CE may transmit a part of the light generated on the light emitting layer (ELM), and reflect remaining light generated on the light emitting layer (ELM). For example, the second electrode CE may be a thin film metal layer thin enough to transmit the light.

The second electrode CE may include a lower work function material than the transparent conductive layer. For example, the second electrode CE may include molybdenum (Mo), tungsten (W), silver (Ag), aluminum (AL), platinum (Pt), palladium (Pd), gold (Au), nickel (Ni), neodymium (Nd), iridium (Ir), chromium (Cr), lithium (Li), and calcium (Ca).

The part of the light emitted on the organic layer OL may not transmit the second electrode CE, and the light reflected from the second electrode CE may be reflected from the first electrode AE which is a reflective layer. That is, the light emitted on the organic layer OL may resonate between the first electrode AE and the second electrode CE. Light extraction efficiency of the display element may be improved by resonation of the light.

In addition, the second electrode CE may include the plurality of electrode patterns overlapping the part of the pixel regions. The electrode patterns may have the same shape as the sensing electrodes in FIGS. 1 to 5.

As described above, the self-capacitance touch screen may include a smaller number of sensing lines than the number of sensing electrodes. Accordingly, even though the self-capacitance touch screen is enlarged, reduction of light transmission by the sensing lines may be prevented.

In addition, a display device including a self-capacitance touch screen may prevent lowering display quality caused by reduction of light transmission.

Embodiments are provided to more sincerely and fully disclose the inventive concept and to completely transfer the spirit of the inventive concept to those skilled in the art to which the inventive concept pertains, and the scope of the inventive concept should be understood by the claims of the inventive concept. Accordingly, it will be understood by those of skill in the art that various changes in form and details may be made without departing from the spirit and scope of the inventive concept as set forth in the following claims. Accordingly, it will be understood by those of skill in the art that various changes in form and details may be made without departing from the spirit and scope of the present inventive concept as set forth in the following claims. Therefore, the technical range of the present inventive concept is not limited to the detailed description of the specification but defined by the range of the claims.

What is claimed is:

1. A self-capacitance touch screen, comprising:
a plurality of sensing rows extending along a first direction, each of the plurality of sensing rows including:
a plurality of sensing electrodes which include a plurality of sensing groups, each of the plurality of sensing groups having at least two sensing electrodes disposed adjacent to each other along the first direction and having a same area, and
a plurality of sensing lines extending along the first direction, each of the plurality of sensing lines being connected to only one sensing electrode in each of the plurality of sensing groups,
wherein a number of the plurality of sensing lines in each of the plurality of sensing rows is the same as a number of the sensing electrodes in each of the plurality of sensing groups, and
wherein the plurality of sensing electrodes are provided on a same plane; and each of the sensing electrodes individually senses a location of a touch.

2. The self-capacitance touch screen of claim 1, wherein the sensing groups include a same number of sensing electrodes.

3. The self-capacitance touch screen of claim 2, wherein a capacitance of a sensing electrode in one sensing group is different from a capacitance of a sensing electrode in another sensing group.

4. The self-capacitance touch screen of claim 3, wherein the sensing groups include the plurality of sensing electrodes, and capacitances of the sensing electrodes in each of the sensing groups are same.

5. The self-capacitance touch screen of claim 2, wherein an area of a sensing electrode in one sensing group is different from an area of a sensing electrode in another sensing group.

6. The self-capacitance touch screen of claim 5, wherein the sensing groups include the plurality of sensing electrodes, and the areas of the sensing electrodes in each of the sensing groups are same.

7. The self-capacitance touch screen of claim 6, wherein each of the sensing electrodes includes a square shape having an opening therein and area defined by outer edges of the square shape is same, and
an area of an opening of the sensing electrode in the one sensing group is different from an area of an opening of a sensing electrode in another sensing group.

8. The self-capacitance touch screen of claim 6, wherein the areas of the sensing electrodes in one sensing group are different from areas of sensing electrodes in another sensing group.

9. A self-capacitance touch screen, comprising:
a plurality of sensing electrodes disposed in a plurality of sensing rows or in a plurality of sensing columns, each of the plurality of sensing electrodes including a first region and a second region electrically separated from each other and disposed adjacent to each other along a first direction; and
a first sensing line extending along the first direction and connected to each of first regions in the plurality of sensing electrodes and not connected to the second region, and a second sensing line extending along the first direction and connected to each of second regions in the plurality of sensing electrodes and not connected to the first region, wherein the plurality of sensing electrodes are provided on a same plane, and each of the sensing electrodes individually senses a location of a touch.

10. The self-capacitance touch screen of claim 9, wherein a sum of areas of the first region and the second region in one sensing electrode is the same as a sum of areas of the first region and the second region in the other sensing electrodes.

11. The self-capacitance touch screen of claim 9, wherein a sum of capacitances of the first region and the second region in one sensing electrode is the same as a sum of capacitances of the first region and the second region in the other sensing electrodes.

12. The self-capacitance touch screen of claim 9, wherein a number of sensing lines connected to one sensing electrode is the same as a number of regions in one sensing row or in one sensing column.

13. The self-capacitance touch screen of claim 9, wherein a capacitance of the first region in one sensing electrode is different from a capacitance of a first region in another sensing electrode, and
a capacitance of the second region in one sensing electrode is different from a capacitance of a second region in another sensing electrode.

14. The self-capacitance touch screen of claim 9, wherein each of the first regions of the sensing electrodes includes a square shape having an opening and an area defined by outer edges of the square shape is same, and
an area of the opening in one sensing electrode is different from an area of an opening in another sensing electrode.

15. The self-capacitance touch screen of claim 14, wherein the second region is disposed in the opening, and
an area of the second region in one sensing electrode is different from an area of a second region in another sensing electrode.

16. A display device, comprising:
a first substrate;
a display element disposed on the first substrate;
a second substrate facing to the first substrate; and
a self-capacitance touch screen disposed on one side of the second substrate,
wherein the self-capacitance touch screen includes a plurality of sensing rows extending along a first direction, each of the plurality of sensing rows including:
a plurality of sensing electrodes which include a plurality of sensing groups, each of the plurality of sensing groups having at least two sensing electrodes disposed adjacent to each other along the first direction and having a same area, and
a plurality of sensing lines extending along the first direction, each of the plurality of sensing lines being connected to only one sensing electrode in each of the plurality of sensing groups,
wherein a number of the plurality of sensing lines in each of the plurality of sensing rows is the same as a number of the sensing electrodes in each of the plurality of sensing groups, and
wherein the plurality of sensing electrodes are provided on a same plane and each of the sensing electrodes individually senses a location of a touch.

17. The display device of claim 16, wherein a capacitance of the sensing electrode in one sensing group is different from a capacitance of a sensing electrode in other sensing groups.

18. The display device of claim 16, wherein an area of the sensing electrode in one sensing group is different from an area of a sensing electrode in other sensing groups.

19. A display device, comprising:
a first substrate;
a display element disposed on the first substrate;
a second substrate facing to the first substrate; and
a self-capacitance touch screen disposed on one side of the second substrate,
wherein the self-capacitance touch screen includes:
a plurality of sensing electrodes disposed in a plurality of sensing rows or in a plurality of sensing columns, each of the plurality of sensing electrodes including a first region and a second region electrically separated from each other and disposed adjacent to each other along a first direction; and
a first sensing line extending along the first direction and connected to each of first regions in the plurality of sensing electrodes and not connected to the second region, and a second sensing line extending along the first direction and connected to each of second regions in the plurality of sensing electrodes and not connected to the first region, and
wherein the plurality of sensing electrodes are provided on a same plane, and each of the sensing electrodes individually senses a location of a touch.

20. The display device of claim 19, wherein a sum of areas of the first region and the second region in one sensing electrode is the same as a sum of areas of the first region and the second region in the other sensing electrodes.

21. The display device of claim 19, wherein a sum of capacitances of the first region and the second region in one sensing electrode is the same as a sum of capacitances of the first region and the second region in the other sensing electrodes.

22. The display device of claim 19, wherein a number of sensing lines connected to one sensing electrode is the same as a number of regions in the sensing electrodes in one sensing row or in one sensing column.

23. The display device of claim 19, wherein a capacitance of the first region in one sensing electrode is different from a capacitance of a first region in another sensing electrode, and
a capacitance of the second region in one sensing electrode is different from a capacitance of a second region in another sensing electrode.

24. A self-capacitance touch screen, comprising:
a first sensing group including a first sensing electrode and a second sensing electrode adjacent to the first sensing electrode;
a second sensing group adjacent to the first sensing group in one direction and including a third sensing electrode and a fourth sensing electrode adjacent to the third sensing electrode;
a first sensing line connected to the first sensing electrode of the first sensing group and the third sensing electrode of the second sensing group; and
a second sensing line connected to the second sensing electrode of the first sensing group and the fourth sensing electrode of the second sensing group,
wherein the first sensing electrode and the second sensing electrode have a first area, and
the third sensing electrode and the fourth sensing electrodes have a second area which is different from the first area.

* * * * *